US010720777B2

(12) United States Patent
McMorrow (10) Patent No.: US 10,720,777 B2
(45) Date of Patent: Jul. 21, 2020

(54) DC INTEGRATION OF BATTERY FOR EXPANDING THE DC:AC RATIO LIMIT OF A PV INVERTER

(71) Applicant: Inventus Holdings, LLC, Juno Beach, FL (US)

(72) Inventor: Ryan K. McMorrow, Jupiter, FL (US)

(73) Assignee: INVENTUS HOLDINGS, LLC, Juno Beach, FL (US)

( * ) Notice: Subject to any disclaimer, the term of this patent is extended or adjusted under 35 U.S.C. 154(b) by 170 days.

(21) Appl. No.: 16/159,836

(22) Filed: Oct. 15, 2018

(65) Prior Publication Data

US 2020/0119561 A1    Apr. 16, 2020

(51) Int. Cl.
| | | |
|---|---|---|
| *H02J 3/38* | (2006.01) | |
| *H02M 3/04* | (2006.01) | |
| *H02J 7/35* | (2006.01) | |
| *H02J 3/14* | (2006.01) | |

(52) U.S. Cl.
CPC ................ *H02J 3/385* (2013.01); *H02J 3/14* (2013.01); *H02J 7/35* (2013.01); *H02M 3/04* (2013.01)

(58) Field of Classification Search
CPC .... H02J 3/385; H02J 3/14; H02J 7/35; H02M 3/04
See application file for complete search history.

(56) References Cited

U.S. PATENT DOCUMENTS

| | | |
|---|---|---|
| 8,791,598 B2 | 7/2014 | Jain |
| 2010/0154858 A1 | 6/2010 | Jain |

FOREIGN PATENT DOCUMENTS

EP    2369709    5/2016

*Primary Examiner* — Robert L Deberadinis
(74) *Attorney, Agent, or Firm* — Tarolli, Sundheim, Covell & Tummino LLP (57) ABSTRACT

A power generation system is disclosed that includes a photovoltaic (PV) array having a number of strings of PV modules switchably connected to a respective input node, an inverter comprising a plurality of inputs each coupled to each respective input node, each respective input node being coupled to a respective input of a DC-to-DC converter. An output of the DC-to-DC converter is switchably connected to an energy storage source, wherein the DC-to-DC converter charges the energy storage source with a portion of an output power of the PV array that exceeds a maximum inverter power. A controller incrementally disconnects subsets of the plurality of strings of PV modules from the respective input nodes to decrease an input current and input power to the inverter in response to an output voltage or output current of the PV array exceeding a threshold and the energy storage source being un-chargeable or unavailable.

20 Claims, 6 Drawing Sheets

DC INTEGRATION OF BATTERY FOR EXPANDING THE DC:AC RATIO LIMIT OF A PV INVERTER

TECHNICAL FIELD

This relates to solar power generation systems, or more particularly to DC integration of batteries for expanding the DC:AC ratio limit of a PV inverter.

BACKGROUND

Photovoltaic (PV) power systems include a number of interoperating components. These components include solar panels to absorb and convert sunlight into electricity, an inverter to change electric current from DC to AC, as well as various other electrical accessories. Photovoltaic power systems may also include a solar tracking system for enhancing the system's overall performance, and an integrated battery solution. Prices of PV system vary by market as well as size of the system.

SUMMARY

This disclosure relates to a system and method to improve the performance of a power generation system by integrating a battery for expanding the DC:AC ratio limit of a PV inverter.

In one example, a power generation system is disclosed. The power generation system includes a photovoltaic (PV) array having a plurality of strings of PV modules, wherein each string is switchably connected to a respective input node, an inverter having a plurality of inputs, wherein each input of the inverter is coupled to each respective input node, and wherein each respective input node is coupled to a respective input of a DC-to-DC converter. The system further includes an output of the DC-to-DC converter switchably connected to the energy storage source via an energy storage source switch, wherein the DC-to-DC converter charges the energy storage source with a portion of an output power of the PV array that exceeds a maximum inverter power when the energy storage source switch is closed. The system further includes a controller that incrementally disconnects subsets of the plurality of strings of PV modules from the respective input nodes to decrease an input current and input power to the inverter in response to an output voltage of the PV array meeting or exceeding an input voltage threshold $V_{TSH}$ of the inverter and the energy storage source being un-chargeable or unavailable, or to decrease an input current and input power to the inverter in response to an output current of the PV array meeting or exceeding an input current threshold $I_{TSH}$ of the inverter and the energy storage source being un-chargeable or unavailable. The controller decreases the output voltage of the PV array to increase the input current and input power to the inverter in response to at least one subset of the plurality of strings of PV modules being incrementally disconnected and the input power of the inverter being below an input power safety threshold $P_{TSH}$ of the inverter, the input power safety threshold $P_{TSH}$ of the inverter corresponding to a maximum inverter power.

In another example, a method of generating power is disclosed. The method includes measuring an output power, an output voltage, and an output current of a photovoltaic (PV) array, detecting whether the measured output power of the PV array exceeds a maximum inverter power, detecting whether the output voltage of the PV array exceeds an input voltage threshold $V_{TSH}$ of the inverter, detecting whether the output current of the PV array exceeds in input current threshold $I_{TSH}$ of the inverter, and determining whether an energy storage source is chargeable and available. The method further includes charging the energy storage source with a portion of the output power of the PV array that exceeds the maximum inverter power in response to detecting that the measured output power of the PV array exceeds the maximum inverter power and determining that the energy storage source is chargeable and available, incrementally disconnecting subsets of a plurality of strings of PV modules of the PV array from the respective input nodes of a DC-to-DC converter and the inverter to decrease an input current and input power to the inverter in response to detecting that the output voltage of the PV array meets or exceeds the input voltage threshold $V_{TSH}$ of the inverter and determining that the energy storage source is un-chargeable or unavailable, or to decrease an input current and an input power to the inverter in response to detecting that the output current of the PV array meets or exceeds the input current threshold $I_{TSH}$ of the inverter and determining that the energy storage source is un-chargeable or unavailable. The method further includes decreasing the output voltage of the PV array to increase the input current and input power to the inverter in response to at least one subset of the plurality of strings of PV modules being incrementally disconnected and the input power of the inverter being below an input power safety threshold $P_{TSH}$ of the inverter, the input power safety threshold $P_{TSH}$ of the inverter corresponding to the maximum inverter power.

In yet another example, a power generation system is disclosed. The power generation system includes a photovoltaic (PV) array switchably connected to the inverter, the PV array comprising a plurality of strings of PV modules. The system further includes a DC energy storage source switchably connected to the inverter and the PV array, wherein the PV array charges the DC energy storage source with a portion of an output power of the PV array that exceeds a maximum inverter power. The system further includes a controller that incrementally disconnects subsets of the plurality of strings of PV modules from a signal conditioner to decrease an input current and input power to the inverter in response to an output voltage of the PV array meeting or exceeding an input voltage threshold $V_{TSH}$ of the inverter and the DC energy storage source being un-chargeable or unavailable, or to decrease an input current and input power to the inverter in response to an output current of the PV array meeting or exceeding an input current threshold $I_{TSH}$ of the inverter and the energy storage source being un-chargeable or unavailable. The controller decreases the output voltage of the PV array to increase the input current and input power to the inverter in response to at least one subset of the plurality of strings of PV modules being incrementally disconnected and the input power of the inverter being below an input power safety threshold $P_{TSH}$ of the inverter, the input power safety threshold $P_{TSH}$ of the inverter corresponding to a maximum inverter power.

DETAILED DESCRIPTION

Disclosed herein are systems and methods that control the connections between a photovoltaic (PV) array, a DC-to-DC converter, an energy storage source and a DC to AC inverter to curtail loss of power generation time and to avoid damaging power generation equipment, such as the inverter. In the present system, strings of PV modules are switchably connected to respective inputs of a DC-to-DC converter. As used herein, the term "switchably connected" indicates that two nodes (e.g., a PV string of a PV array and an input to a DC-to-DC converter or an inverter) are intermittently electrically connected based on a status of a switch. Each respective input is also connected to the inverter. An output of the DC-to-DC converter is coupled (e.g., switchably connected) to an energy storage source (e.g., a battery bank), and an output of the inverter is coupled to a power grid.

The PV array has a maximum output power that is greater than a maximum power rating of the inverter. This may occur when the sun is directly over the solar field, such the hours around "high noon". Implementing a PV array that has a maximum power significantly (e.g. >20%) greater than the maximum power of the inverter has an advantage in that the inverter may produce maximum solar power longer during the day, e.g. maximum power is achieved earlier in the morning as the sun rises and maximum power is maintained longer in the evening, as the sun sets. Furthermore, the inverter may maintain maximum power under conditions of greater cloud cover at mid-day, thereby making solar power generation more predictable. Thus, during time periods with certain operating conditions (e.g., ideal operating conditions), the output power of the PV array may exceed the maximum power rating of the inverter. During such time periods, the DC-to-DC converter can charge the energy storage device with a portion of the power that exceeds the maximum power rating of the inverter.

Intermittently, the energy storage source is not chargeable. For example, the energy storage source may be fully charged or temporarily offline. During the time periods where the output power of the PV array exceeds the maximum power rating of the inverter and the energy storage source is not chargeable, the inverter can increase the output voltage of the PV array to decrease the current (and as a result, the power) provided by the PV array. Maximum power point tracking (MPPT) is a method typically used with PV systems to extract a highest power level under variable conditions. MPPT is a solution that changes load characteristics based on the variation of a power source and a power generation system. For example, in a solar power system, as the amount of sunlight directed to a number of solar panels varies, load characteristics change to keep the power transfer system at a most efficient level. An MPPT system samples the output of PV cells to apply a proper load resistance to obtain a highest level of power for a given condition of the environment. MPPT also involves the inverter identifying an operating point that maximizes the output power of the PV array. For example, an MPPT operation is used to adjust an input voltage or an input current to the inverter. MPPT operations are also used in some examples to reduce the output power of the PV array to prevent exceeding the operating limits of the inverter.

In some situations, the output voltage of the PV array may continue to rise to a level exceeding an input voltage threshold of the inverter (e.g., a safety threshold). Also, in some situations, the output current of the PV array may continue to rise to a level above an input current threshold of the inverter (e.g., another safety threshold). To avoid damage to the inverter, the system can incrementally disconnect a subset of the strings of the PV modules from the DC-to-DC converter and the inverter. Disconnecting the subset of the strings reduces the input current and input power to the inverter. Upon a maximum output power of the PV array falling below an input power safety threshold of the inverter, the system can incrementally reconnect the subset of the strings of the PV modules to the DC-to-DC converter and the inverter to increase the input current and input power to the inverter. By controlling the connections between the PV array, the energy storage source and the inverter in this manner, damage to the inverter caused by excessive output power of the PV array is avoided. Additionally, the inclusion of the energy storage source prevents unnecessary disconnections of the strings, thereby elevating overall power generation and allowing more PV modules to be connected to an inverter than an inverter would otherwise be capable of controlling.

Figure 1:
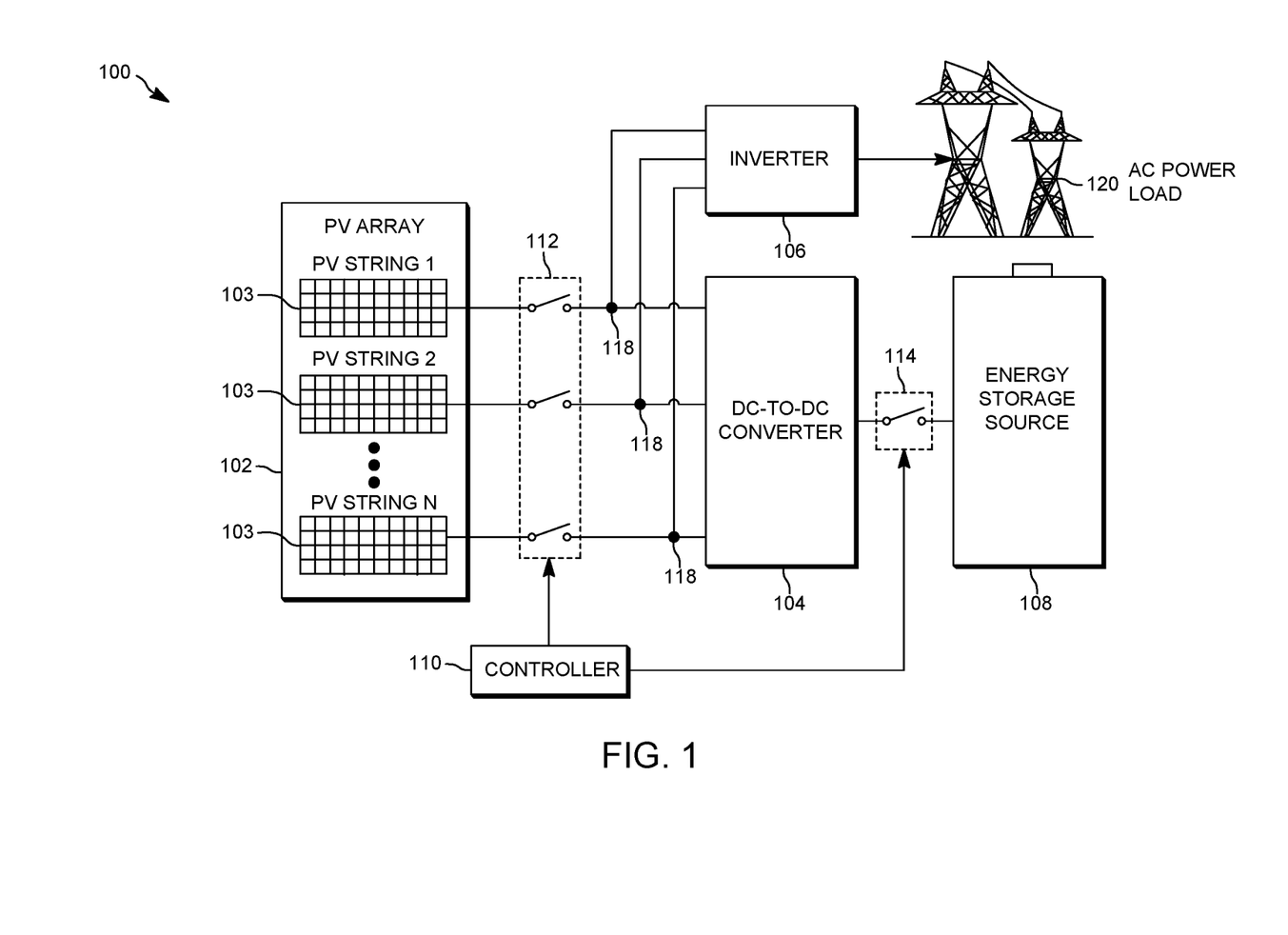
FIG. 1 is a block diagram of an example photovoltaic power system.

FIG. 1 is a block diagram of an example photovoltaic power system 100. The photovoltaic power system 100 includes a PV array 102 that includes a plurality of PV strings 103 each switchably connected to a DC-to-DC converter 104. In some examples, the PV array 102 corresponds to an array of solar panels that absorb and convert sunlight into electricity. Thus, in some examples, each PV string 103 can correspond to a solar panel or an array of solar panels. In the example shown by FIG. 1, there are N such PV strings 103, namely PV string 1, PV string 2, up to PV string N (N being an integer greater than or equal to 2). The PV array 102 is switchably connected to the DC-to-DC converter 104 via a collection of switches 112, such that an output of a PV string 103 is respectively coupled to an input node 118 of the DC-to-DC converter 104. In the example shown by FIG. 1, the collection of switches 112 are implemented as an array of relays external to the DC-to-DC converter 104. In other examples, the collection of switches 112 are integrated with the DC-to-DC converter 104 and/or the inverter 106. Each respective input node 118 is also coupled to the inverter 106. The inverter 106 is configured to convert direct current (DC) to alternating current (AC) that is provided to an AC power load 120. In some examples, the AC power load 120 is a power grid. Additionally, the DC-to-DC converter 104 is switchably connected to an energy storage source 108 via a switch 114. In some examples, the energy storage source 108 is a battery bank. The controller 110 is configured to control the switches 112 that control the selective connection and disconnection of PV strings 103 to/from the DC-to-DC converter 104. The controller 110 is also configured to control the switch 114 that controls the selective connection and disconnection of the DC-to-DC converter to/from the energy storage source 108.

The PV array 102 has a maximum output power rating that is greater than the maximum output power rating of the inverter 106, which indicates that an array-to-inverter ratio is greater than 1. As used herein, the term "array-to-inverter ratio" refers to the ratio of the maximum output power rating of the PV array 102 to the maximum output power rating of the inverter 106. In the solar industry, the array-to-inverter ratio is known by several names, including the oversizing ratio, overloading ratio, as well as the DC-AC ratio. As an example, a system with a 140 kilowatt direct current (kWdc) PV array feeding a 100 kilowatt alternating current (kWac) inverter has an array-to-inverter ratio of 1.4. In the example shown in FIG. 1, the DC-AC ratio is in a range of about 1.7-2.4. As the cost for a PV array has declined, higher DC-AC ratios are favored in addition to elevating parameters to increase energy production per PV module. Because the DC-AC ratio is greater than one, during time periods with certain operating conditions (e.g., ideal operating conditions) the output power of the PV array 102 may exceed the maximum power rating of the inverter 106. During such time periods, the controller 110 closes the switch 114 so that the DC-to-DC converter 104 charges the energy storage source 108 with a portion of the power that exceeds the maximum power rating of the inverter 106. Charging the energy storage source 108 also increases the power load on the PV array 102, reducing the power moving from the PV array 102 to the inverter 106 and thereby aiding in keeping the inverter 106 within its operational limits.

Intermittently, the energy storage source 108 is not chargeable. For example, the energy storage source 108 may be fully charged or temporarily offline. In such situations, the controller 110 opens the switch 114 to disconnect the energy storage source 108 from the DC-to-DC converter 104.

During the time periods where the output power of the PV array 102 exceeds the maximum power rating of the inverter 106 and the energy storage source 108 is not chargeable, in some examples, the PV array 102, the inverter 106, or the controller 110 can decrease the output power of the PV array 102 to decrease the input power provided to the inverter 106 through execution of an MPPT operation. Additionally or alternatively, in some situations, the output voltage of the PV array 102 may continue to rise to a level exceeding an input voltage threshold (e.g., a safety threshold) of the inverter 106. Also, in some situations, the output current of the PV array 102 may continue to rise to a level above an input current threshold (e.g., another safety threshold) of the inverter 106. That is, in some examples, the MPPT operation may not be sufficient to prevent the output voltage of the PV array 102 from rising to the level that exceeds the input voltage threshold of the inverter 106, or to prevent the output current of the PV array 102 from rising to a level that exceeds the input current threshold of the inverter 106. In other examples, the MPPT operation may be omitted, and the output voltage of the PV array 102 also rises to the level that exceeds the input voltage threshold of the inverter 106 or the output current of the PV array 102 rises to a level that exceeds the input current threshold of the inverter 106 without the interceding MPPT operation. In either situation, to avoid damage to the inverter 106, the photovoltaic power system 100, via the controller 110, incrementally disconnects a subset of the PV strings 103 of the PV modules from the DC-to-DC converter 104 and the inverter 106. The controller 110 also incrementally disconnects subsets of the plurality of PV strings 103 of PV modules from the respective input nodes to decrease an input current and input power to the inverter 106 in response to an output power of the PV array 102 meeting or exceeding an input power safety threshold $P_{TSH}$ of the inverter 106, and the energy storage source 108 being un-chargeable or unavailable. Disconnecting the subset of the PV strings 103 reduces the input current and input power to the inverter 106 because more power is drawn from the remaining connected PV strings 103, thereby reducing the current and power produced by the remaining PV strings 103.

Upon the input voltage to the inverter 106 dropping below the input voltage threshold of the inverter (or a hysteresis voltage less than the threshold voltage), or the input current to the inverter 106 dropping below the input current threshold of the inverter, two scenarios are possible. In the first scenario, the system power falls below a safety threshold (e.g., the input power safety threshold $P_{TSH}$ of the inverter), and in response, the PV array 102, inverter 106, or controller 110 adjusts (e.g., lowers) the output voltage of the PV array 102 with the MPPT operation to raise the power to meet the safety threshold. In the second scenario, the system power falls below the safety threshold, and in response, the PV array 102, inverter 106, or controller 110 adjusts (e.g., lowers) the output voltage of the PV array 102 in the MPPT operation to raise the power to the inverter 106 to a maximum power, but this maximum power is still below the safety threshold. In the second scenario, the photovoltaic power system 100, via the controller 110, incrementally reconnects the subset of the PV strings 103 of the PV modules to the DC-to-DC converter 104 and the inverter 106 to increase the input current or input power to the inverter 106. Furthermore, it is noted that the two scenarios are not mutually exclusive. For instance, at one point (in the first scenario) the maximum output power of the PV array 102 may be above the safety threshold of the inverter 106. In this situation, the voltage is adjusted to a level that causes the output power of the PV array 102 to be both below the maximum power and meet the safety threshold of the inverter 106. Continuing with this example, as environmental conditions change to the output power of the PV array 102 may drop over time, and the output voltage of the PV array 102 is continuously or periodically re-adjusted. Once the output power of the PV array 102 reaches a maximum, and that maximum output power is still below the safety threshold of the inverter 106, photovoltaic power system 100, via the controller 110 (now operating in the second scenario) incrementally reconnects the subset of the PV strings 103 of the PV modules to the DC-to-DC converter 104 and the inverter 106 to increase the input voltage or the input current to the inverter 106. In some examples, the input power safety threshold $P_{TSH}$ of the inverter 106 corresponds to a maximum inverter power of the inverter 106 or a maximum power rating of the inverter 106.

By controlling the connections between the PV array 102, the energy storage source 108 and the inverter 106 in this manner, damage to the inverter 106 caused by an excessive output voltage of the PV array 102 or an excessive output current of the PV array 102 is avoided. Additionally, the inclusion of the energy storage source 108 prevents unnecessary disconnections of the strings 103, thereby elevating overall power generation.

Additionally, in response to the controller 110 incrementally reconnecting the disconnected subsets of the plurality of PV strings 103 of PV modules to the input nodes 118 coupled to the inputs of the DC-to-DC converter 104 and the inverter 106, the energy storage source 108 is used to power the inverter 106, and maintain a maximum power point voltage ($V_{MPP}$) and the maximum inverter power, as the power of the PV array 102 decreases below the maximum inverter power. A voltage corresponding to a maximum power point of the PV array 102 ($V_{MPP}$) is less than the input voltage threshold $V_{TSH}$ of the inverter 106 and the input voltage threshold $V_{TSH}$ of the inverter 106 is a safety voltage based upon protection of the inverter 106.

As used herein, to "incrementally disconnect" a subset of PV strings of PV modules refers to disconnecting one subset at a time, and after each disconnection of one subset, the system checks whether either 1) the output voltage of the PV array (e.g., the PV array 102) continues to exceed an input voltage threshold (e.g., a safety threshold) of the inverter (e.g., the inverter 106), 2) an output current of the PV array continues to exceed an input current threshold (e.g., another safety threshold) of the inverter, 3) an output power of the PV array continues to exceed an input power safety threshold (e.g., yet another safety threshold) of the inverter, and/or 4) a specific DC-AC ratio has been achieved. Incrementally disconnecting a subset of PV strings in such a manner, by each time comparing the PV array output voltage, output current, and/or output power to a threshold and/or checking whether a predetermined DC-AC ratio has been met, prevents disconnecting an unnecessary number of PV strings. Conversely, to "incrementally reconnect" a subset of PV strings refers to reconnecting one subset at a time, and after each reconnection of one subset, the system checks whether either 1) the output voltage of the PV array (e.g., the PV array 102) has risen above the input voltage threshold (e.g., a safety threshold) of the inverter (e.g., the inverter 106), 2) the output current of the PV array has risen above the input current threshold (e.g., another safety threshold) of the inverter, 3) an output power of the PV array has risen above an input power safety threshold (e.g., yet another safety threshold) of the inverter, and/or 4) a specific DC-AC ratio has been achieved. Incrementally reconnecting a subset of PV strings in such a manner, by each time comparing the PV array output voltage, output current, and/or output power to a threshold and/or checking whether a predetermined DC-AC ratio has been met, prevents reconnecting an unnecessary number of PV strings.

The photovoltaic power system 100 may also include a rotational PV connect/disconnect strategy. If the PV strings 103 are disconnected in a sequence (e.g., 1, 2, 3, 4), then an example reconnect strategy is sequenced the same way (e.g., 1, 2, 3, 4, rather than 4, 3, 2, 1), and the next disconnect is sequenced as 5, 6, 7 . . . (rather than 1, 2, 3 . . . again). An example connect/disconnect strategy of this type is an attempt to assure that strings are more equally disconnected which may extend the life of the photovoltaic power system 100. Another approach is to maintain a calculated record of curtailed power of each PV string 103 and disconnect and reconnect PV strings 103 to substantially maintain all PV strings 103 at an equivalent total amount of curtailment, e.g. the PV string 103 with the lowest total curtailed power is disconnected first (thereby increasing it curtailed power) and reconnected last.

Figure 2:
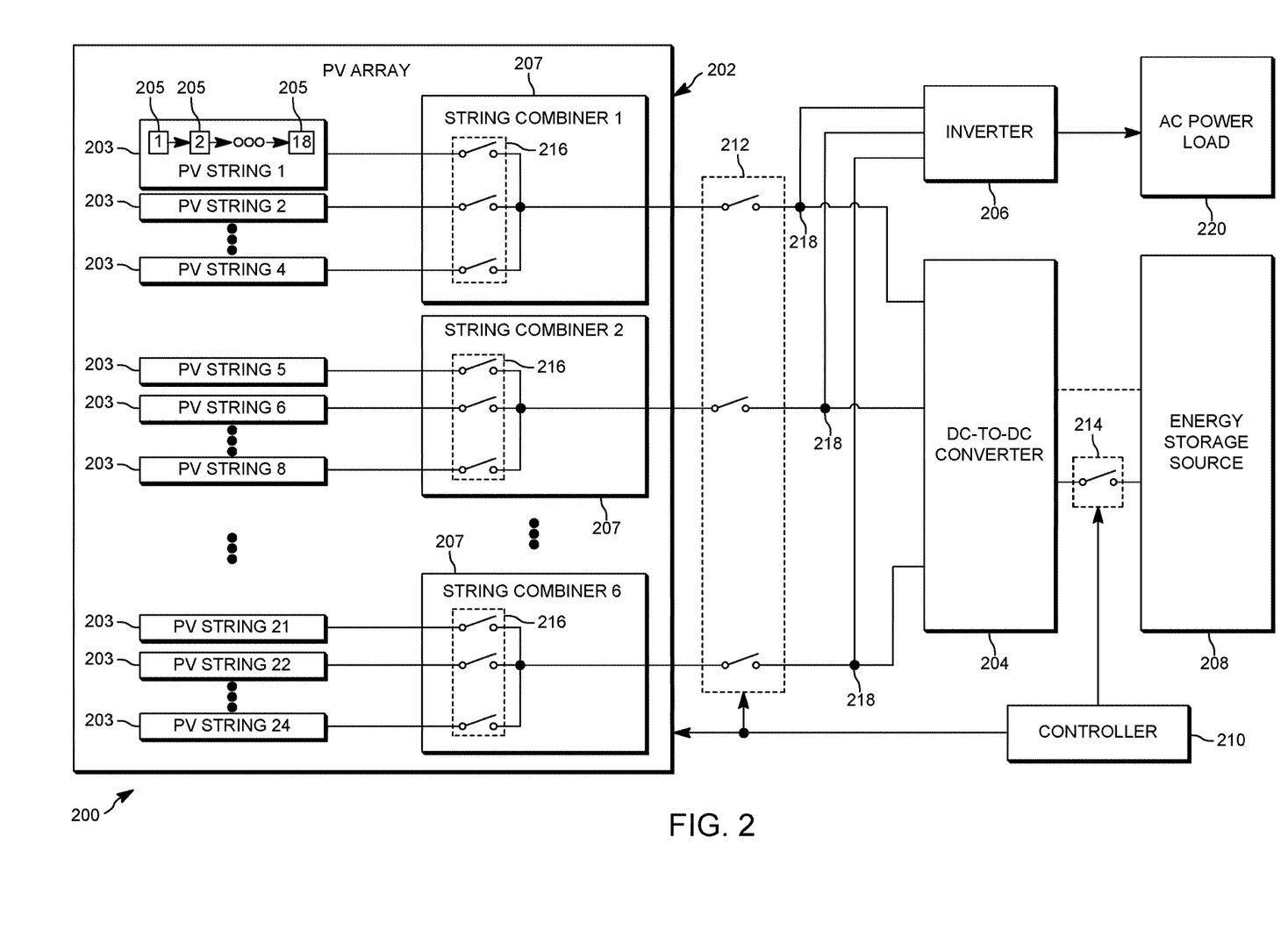
FIG. 2 is a block diagram of another example photovoltaic power system.

FIG. 2 is a block diagram of another example photovoltaic power system 200. The photovoltaic power system 200 is implemented similarly to the photovoltaic power system 100 of FIG. 1. FIG. 2, however, shows an expansion of the PV array 202. Like the photovoltaic power system 100 shown in FIG. 1, the photovoltaic power system 200 includes a PV array 202 that includes a plurality of PV strings 203 each switchably connected to a DC-to-DC converter 204. In FIG. 2, there are twenty-four (24) PV strings 203, each consisting of eighteen (18) PV modules 205. However, the number of PV strings within the PV array, as well as the number of PV modules within each PV string, is variable and depends on a particular system configuration. However, in FIG. 2, the PV strings 203 are switchably connected to the DC-to-DC converter 204 through a set of string combiners 207. The controller 210 selectively combines PV strings 203, via a collection of switches 216 depending on a desired output level of the PV array 202. In the example shown in FIG. 2, the switches 216 are implemented within the string combiners 207, while in other examples, the switches 216 are implemented as an array of relays external to the string combiners 207.

In some examples, the PV array 202 corresponds to an array of solar panels that absorb and convert sunlight into electricity. Thus, in some examples, each PV string 203 corresponds to a solar panel or an array of solar panels, as do each PV module 205. In the example shown by FIG. 2, there are 24 such PV strings 203, namely PV string 1, PV string 2, up to PV string 24. The PV array 202 is switchably connected to the DC-to-DC converter 204 via a collection of switches 212, such that an output of a PV string 203 is respectively coupled to an input node 218 of the DC-to-DC converter 204. In the example shown by FIG. 2, the collection of switches 212 are implemented as an array of relays external to the DC-to-DC converter 204. In other examples, the collection of switches 212 are integrated with the DC-to-DC converter 204. Each respective input node 218 is also coupled to the inverter 206. The inverter 206 is configured to convert direct current (DC) to alternating current (AC) that is provided to an AC power load 220. In some examples, the AC power load 220 is a power grid. Additionally, the DC-to-DC converter 204 is switchably connected to an energy storage source 208 via a switch 214. In some examples, the energy storage source 208 is a battery bank. The controller 210 is configured to control the switches 212 that control the selective connection and disconnection of PV strings 203 via the string combiners 207 to/from the DC-to-DC converter 204 (as mentioned, the controller 210 controls the switches 216 within the string combiners 207, as well). The controller 210 is also configured to control the switch 214 that controls the selective connection and disconnection of the DC-to-DC converter 204 to/from the energy storage source 208.

The PV array 202 has a maximum output power rating that is greater than the maximum output power rating of the inverter 206, which indicates that an array-to-inverter ratio is greater than 1. In the example shown in FIG. 2, the DC-AC ratio is in a range of about 1.7-2.4. Because the DC-AC ratio is greater than one, during time periods with certain operating conditions (e.g., ideal operating conditions) the output power of the PV array 202 may exceed the maximum power rating of the inverter 206. During such time periods, the controller 210 closes the switch 214 so that the DC-to-DC converter 204 charges the energy storage source 208 with a portion of the power that exceeds the maximum power rating of the inverter 206. Charging the energy storage source 208 also increases the power load on the PV array 202, reducing the power moving from the PV array 202 to the inverter 206 and thereby aiding in keeping the inverter 206 within its operational limits.

Intermittently, the energy storage source 208 is not chargeable. For example, the energy storage source 208 may be fully charged or temporarily offline. In such situations, the controller 210 opens the switch 214 to disconnect the energy storage source 208 from the DC-to-DC converter 204.

During the time periods where the output power of the PV array 202 exceeds the maximum power rating of the inverter 206 and the energy storage source 208 is not chargeable, in some examples, the PV array 202, the inverter 206, or the controller 210 can decrease the output power of the PV array 202 to decrease the input power provided to the inverter 206 through execution of an MPPT operation. Additionally or alternatively, in some situations, the output voltage of the PV array 202 may continue to rise to a level exceeding an input voltage threshold (e.g., a safety threshold) of the inverter 206. Also, in some situations, the output current of the PV array 202 may continue to rise to a level above an input current threshold (e.g., another safety threshold) of the inverter 206. That is, in some examples, the MPPT operation may not be sufficient to prevent the output voltage of the PV array 202 from rising to the level that exceeds the input voltage threshold of the inverter 206, or to prevent the output current of the PV array 202 from rising to a level that exceeds the input current threshold of the inverter 206. In other examples, the MPPT operation may be omitted, and the output voltage of the PV array 202 also rises to the level that exceeds the input voltage threshold of the inverter 206 or the output current of the PV array 102 rises to a level that exceeds the input current threshold of the inverter 206 without the interceding MPPT operation. In either situation, to avoid damage to the inverter 206, the photovoltaic power system 200, via the controller 210, incrementally disconnects a subset of the PV strings 203 of the PV modules from the DC-to-DC converter 204 and the inverter 206. The controller 210 also incrementally disconnects subsets of the plurality of PV strings 203 of PV modules 205 from the respective input nodes to decrease an input current and input power to the inverter 206 in response to an output power of the PV array 202 meeting or exceeding an input power safety threshold $P_{TSH}$ of the inverter 206, and the energy storage source 208 being un-chargeable or unavailable. Disconnecting the subset of the PV strings 203 reduces the input current and input power to the inverter 206 because more power is drawn from the remaining connected PV strings 203, thereby reducing the current and power produced by the remaining PV strings 203.

Upon the input voltage to the inverter 206 dropping below the input voltage threshold of the inverter (or a hysteresis voltage less than the threshold voltage), or the input current to the inverter 206 dropping below the input current threshold of the inverter 206, two scenarios are possible. In the first scenario, the system power falls below a safety threshold (e.g., the input power safety threshold $P_{TSH}$ of the inverter 206), and in response, the PV array 202, inverter 206, or controller 210 adjusts (e.g., lowers) the output voltage of the PV array 202 with the MPPT operation to raise the power to meet the safety threshold. In the second scenario, the system power falls below the safety threshold, and in response, the PV array 202, inverter 206, or controller 210 adjusts (e.g., lowers) the output voltage of the PV array 202 in the MPPT operation to raise the power to the inverter 206 to a maximum power, but this maximum power is still below the safety threshold. In the second scenario, the photovoltaic power system 200, via the controller 210, incrementally reconnects the subset of the PV strings 203 of the PV modules to the DC-to-DC converter 204 and the inverter 206 to increase the input current or input power to the inverter 206. Furthermore, it is noted that the two scenarios are not mutually exclusive. For instance, at one point (in the first scenario) the maximum output power of the PV array 202 may be above the safety threshold of the inverter 206. In this situation, the voltage is adjusted to a level that causes the output power of the PV array 202 to be both below the maximum power and meet the safety threshold of the inverter 206. Continuing with this example, as environmental conditions change to the output power of the PV array 202 may drop over time, and the output voltage of the PV array 202 is continuously or periodically re-adjusted. Once the output power of the PV array 202 reaches a maximum, and that maximum output power is still below the safety threshold of the inverter 206, photovoltaic power system 200, via the controller 210 (now operating in the second scenario) incrementally reconnects the subset of the PV strings 203 of the PV modules 205 to the DC-to-DC converter 204 and the inverter 206 to increase the input voltage or the input current to the inverter 206. In some examples, the input power safety threshold $P_{TSH}$ of the inverter 206 corresponds to a maximum inverter power of the inverter 206 or a maximum power rating of the inverter 206.

By controlling the connections between the PV array 202, the energy storage source 208 and the inverter 206 in this manner, damage to the inverter 206 caused by an excessive output voltage of the PV array 202 or an excessive output current of the PV array 202 is avoided. Additionally, the inclusion of the energy storage source 208 prevents unnecessary disconnections of the PV strings 203, thereby elevating overall power generation.

Additionally, in response to the controller 210 incrementally reconnecting the disconnected subsets of the plurality of PV strings 203 of PV modules to the input nodes 218 coupled to the inputs of the DC-to-DC converter 204 and the inverter 206, the energy storage source 208 is used to power the inverter 206, and maintain a maximum power point voltage ($V_{MPP}$) and the maximum inverter power, as the power of the PV array 202 decreases below the maximum inverter power. A voltage corresponding to a maximum power point of the PV array 202 ($V_{MPP}$) is less than the input voltage threshold $V_{TSH}$ of the inverter 206 and the input voltage threshold $V_{TSH}$ of the inverter 206 is a safety voltage based upon protection of the inverter 206.

The photovoltaic power system 200 may also include a rotational PV connect/disconnect strategy. If the PV strings 203 are disconnected in a sequence (e.g., 1, 2, 3, 4), then an example reconnect strategy is sequenced the same way (e.g., 1, 2, 3, 4, rather than 4, 3, 2, 1), and the next disconnect is sequenced as 5, 6, 7 . . . (rather than 1, 2, 3 . . . again). An example connect/disconnect strategy of this type is an attempt to assure that strings are more equally disconnected which may extend the life of the photovoltaic power system 200. Another approach is to maintain a calculated record of curtailed power of each PV string 203 and disconnect and reconnect PV strings 203 to substantially maintain all PV strings 203 at an equivalent total amount of curtailment, e.g. the PV string 203 with the lowest total curtailed power is disconnected first (thereby increasing it curtailed power) and reconnected last.

Figure 3:
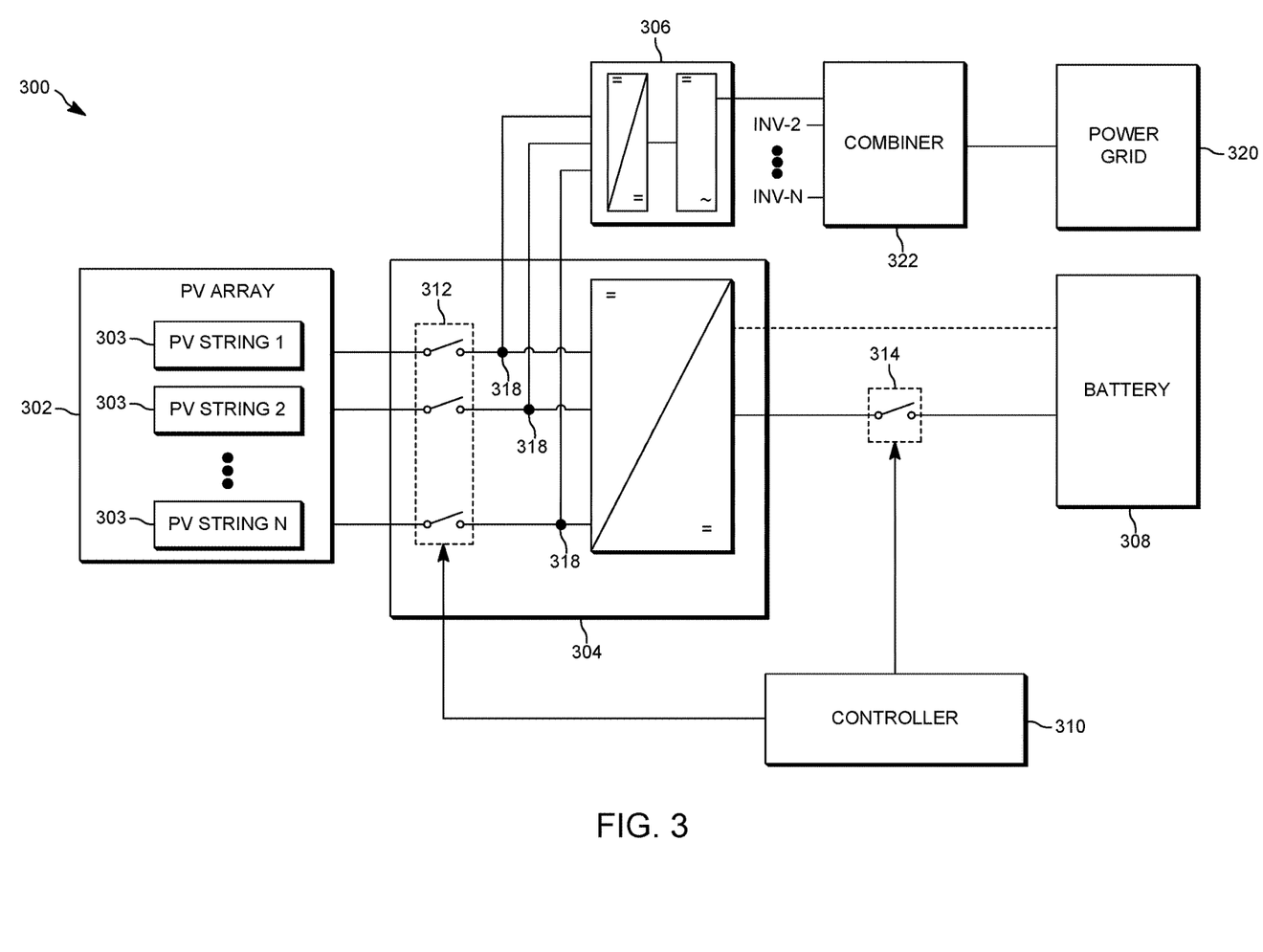
FIG. 3 is a block diagram of another example photovoltaic power system.

FIG. 3 is a block diagram of another example photovoltaic power system 300. The photovoltaic power system 300 is implemented similarly to the photovoltaic power system 100 of FIG. 1 and the photovoltaic power system 200 of FIG. 3. In FIG. 3, however, an inverter combiner 322 is implemented which combines the outputs of several inverters, namely inverter 306, a second inverter INV-2, up to an Nth inverter INV-N (N being an integer greater than or equal to 1). The photovoltaic power system 300 includes a PV array 302 that includes a plurality of PV strings 303 each switchably connected to a DC-to-DC converter 304. In some examples, the PV array 302 corresponds to an array of solar panels that absorb and convert sunlight into electricity. Thus, in some examples, each PV string 303 can correspond to a solar panel or an array of solar panels. In the example shown by FIG. 3, there are N such PV strings 303, namely PV string 1, PV string 2, up to PV string N (N being an integer greater than or equal to 2). The PV array 302 is switchably connected to the DC-to-DC converter 304 via a collection of switches 312, such that an output of a PV string 303 is respectively coupled to an input node 318 of the DC-to-DC converter 304. In the example shown in FIG. 3, the collection of switches 312 is integrated with the DC-to-DC converter 304. In other examples, such as the examples shown by FIGS. 1 and 2, the collection of switches 312 are implemented as an array of relays external to the DC-to-DC converter 304. Each respective input node 318 is also coupled to the inverter 306. The inverter 306 is configured to convert direct current (DC) to alternating current (AC) that is provided to a power grid 320. In some examples, the power grid 320 is an integrated transformer. Additionally, the DC-to-DC converter 304 is switchably connected to a battery 308 (e.g., an energy storage source) via a switch 314. The controller 310 is configured to control the switches 312 that control the selective connection and disconnection of PV strings 303 to/from the DC-to-DC converter 304. The controller 310 is also configured to control the switch 314 that controls the selective connection and disconnection of the DC-to-DC converter to/from the battery 308.

The PV array 302 has a maximum output power rating that is greater than the maximum output power rating of the inverter 306, which indicates that an array-to-inverter ratio is greater than 1. In the example shown in FIG. 3, the DC-AC ratio is in a range of about 1.7-2.4. Because the DC-AC ratio is greater than one, during time periods with certain operating conditions (e.g., ideal operating conditions) the output power of the PV array 302 may exceed the maximum power rating of the inverter 306. During such time periods, the controller 310 closes the switch 314 so that the DC-to-DC converter 304 charges the battery 308 with a portion of the power that exceeds the maximum power rating of the inverter 306. Charging the energy storage source 308 also increases the power load on the PV array 302, reducing the power moving from the PV array 302 to the inverter 306 and thereby aiding in keeping the inverter 306 within its operational limits.

Intermittently, the energy storage source 308 is not chargeable. For example, the energy storage source 308 may be fully charged or temporarily offline. In such situations, the controller 310 opens the switch 314 to disconnect the energy storage source 308 from the DC-to-DC converter 304.

During the time periods where the output power of the PV array 302 exceeds the maximum power rating of the inverter 306 and the energy storage source 308 is not chargeable, in some examples, the PV array 302, the inverter 306, or the controller 310 can decrease the output power of the PV array 302 to decrease the input power provided to the inverter 306 through execution of an MPPT operation. Additionally or alternatively, in some situations, the output voltage of the PV array 302 may continue to rise to a level exceeding an input voltage threshold (e.g., a safety threshold) of the inverter 306. Also, in some situations, the output current of the PV array 302 may continue to rise to a level above an input current threshold (e.g., another safety threshold) of the inverter 306. That is, in some examples, the MPPT operation may not be sufficient to prevent the output voltage of the PV array 302 from rising to the level that exceeds the input voltage threshold of the inverter 306, or to prevent the output current of the PV array 302 from rising to a level that exceeds the input current threshold of the inverter 306. In other examples, the MPPT operation may be omitted, and the output voltage of the PV array 302 also rises to the level that exceeds the input voltage threshold of the inverter 306 or the output current of the PV array 302 rises to a level that exceeds the input current threshold of the inverter 306 without the interceding MPPT operation. In either situation, to avoid damage to the inverter 306, the photovoltaic power system 300, via the controller 310, incrementally disconnects a subset of the PV strings 303 of the PV modules from the DC-to-DC converter 304 and the inverter 306. The controller 310 also incrementally disconnects subsets of the plurality of PV strings 303 of PV modules from the respective input nodes to decrease an input current and input power to the inverter 306 in response to an output power of the PV array 302 meeting or exceeding an input power safety threshold $P_{TSH}$ of the inverter 306, and the battery 308 being un-chargeable or unavailable. Disconnecting the subset of the PV strings 303 reduces the input current and input power to the inverter 306 because more power is drawn from the remaining connected PV strings 303, thereby reducing the current and power produced by the remaining PV strings 303.

Upon the input voltage to the inverter 306 dropping below the input voltage threshold of the inverter (or a hysteresis voltage less than the threshold voltage), or the input current to the inverter 306 dropping below the input current threshold of the inverter 306, two scenarios are possible. In the first scenario, the system power falls below a safety threshold (e.g., the input power safety threshold $P_{TSH}$ of the inverter 306), and in response, the PV array 302, inverter 306, or controller 310 adjusts (e.g., lowers) the output voltage of the PV array 302 with the MPPT operation to raise the power to meet the safety threshold. In the second scenario, the system power falls below the safety threshold, and in response, the PV array 302, inverter 306, or controller 310 adjusts (e.g., lowers) the output voltage of the PV array 302 in the MPPT operation to raise the power to the inverter 306 to a maximum power, but this maximum power is still below the safety threshold. In the second scenario, the photovoltaic power system 300, via the controller 310, incrementally reconnects the subset of the PV strings 303 of the PV modules to the DC-to-DC converter 304 and the inverter 306 to increase the input current or input power to the inverter 306. Furthermore, it is noted that the two scenarios are not mutually exclusive. For instance, at one point (in the first scenario) the maximum output power of the PV array 302 may be above the safety threshold of the inverter 306. In this situation, the voltage is adjusted to a level that causes the output power of the PV array 302 to be both below the maximum power and meet the safety threshold of the inverter 306. Continuing with this example, as environmental conditions change to the output power of the PV array 302 may drop over time, and the output voltage of the PV array 302 is continuously or periodically re-adjusted. Once the output power of the PV array 302 reaches a maximum, and that maximum output power is still below the safety threshold of the inverter 306, photovoltaic power system 300, via the controller 310 (now operating in the second scenario) incrementally reconnects the subset of the PV strings 303 of PV modules to the DC-to-DC converter 304 and the inverter 306 to increase the input voltage or the input current to the inverter 306. In some examples, the input power safety threshold $P_{TSH}$ of the inverter 306 corresponds to a maximum inverter power of the inverter 306 or a maximum power rating of the inverter 306.

By controlling the connections between the PV array 302, the battery 308 and the inverter 306 in this manner, damage to the inverter 306 caused by an excessive output voltage of the PV array 302 or an excessive output current of the PV array 302 is avoided. Additionally, the inclusion of the battery 308 prevents unnecessary disconnections of the PV strings 303, thereby elevating overall power generation.

Additionally, in response to the controller 310 incrementally reconnecting the disconnected subsets of the plurality of PV strings 303 of PV modules to the input nodes 318 coupled to the inputs of the DC-to-DC converter 304 and the inverter 306, the battery 308 is used to power the inverter 306, and maintain a maximum power point voltage ($V_{MPP}$) and the maximum inverter power, as the power of the PV array 302 decreases below the maximum inverter power. A voltage corresponding to a maximum power point of the PV array 302 ($V_{MPP}$) is less than the input voltage threshold $V_{TSH}$ of the inverter 306 and the input voltage threshold $V_{TSH}$ of the inverter 306 is a safety voltage based upon protection of the inverter 306.

The photovoltaic power system 300 may also include a rotational PV connect/disconnect strategy. If the PV strings 303 are disconnected in a sequence (e.g., 1, 2, 3, 4), then an example reconnect strategy is sequenced the same way (e.g., 1, 2, 3, 4, rather than 4, 3, 2, 1), and the next disconnect is sequenced as 5, 6, 7 . . . (rather than 1, 2, 3 . . . again). An example connect/disconnect strategy of this type is an attempt to assure that strings are more equally disconnected which may extend the life of the photovoltaic power system 300. Another approach is to maintain a calculated record of curtailed power of each PV string 303 and disconnect and reconnect PV strings 303 to substantially maintain all PV strings 303 at an equivalent total amount of curtailment, e.g. the PV string 303 with the lowest total curtailed power is disconnected first (thereby increasing it curtailed power) and reconnected last.

Figure 4:
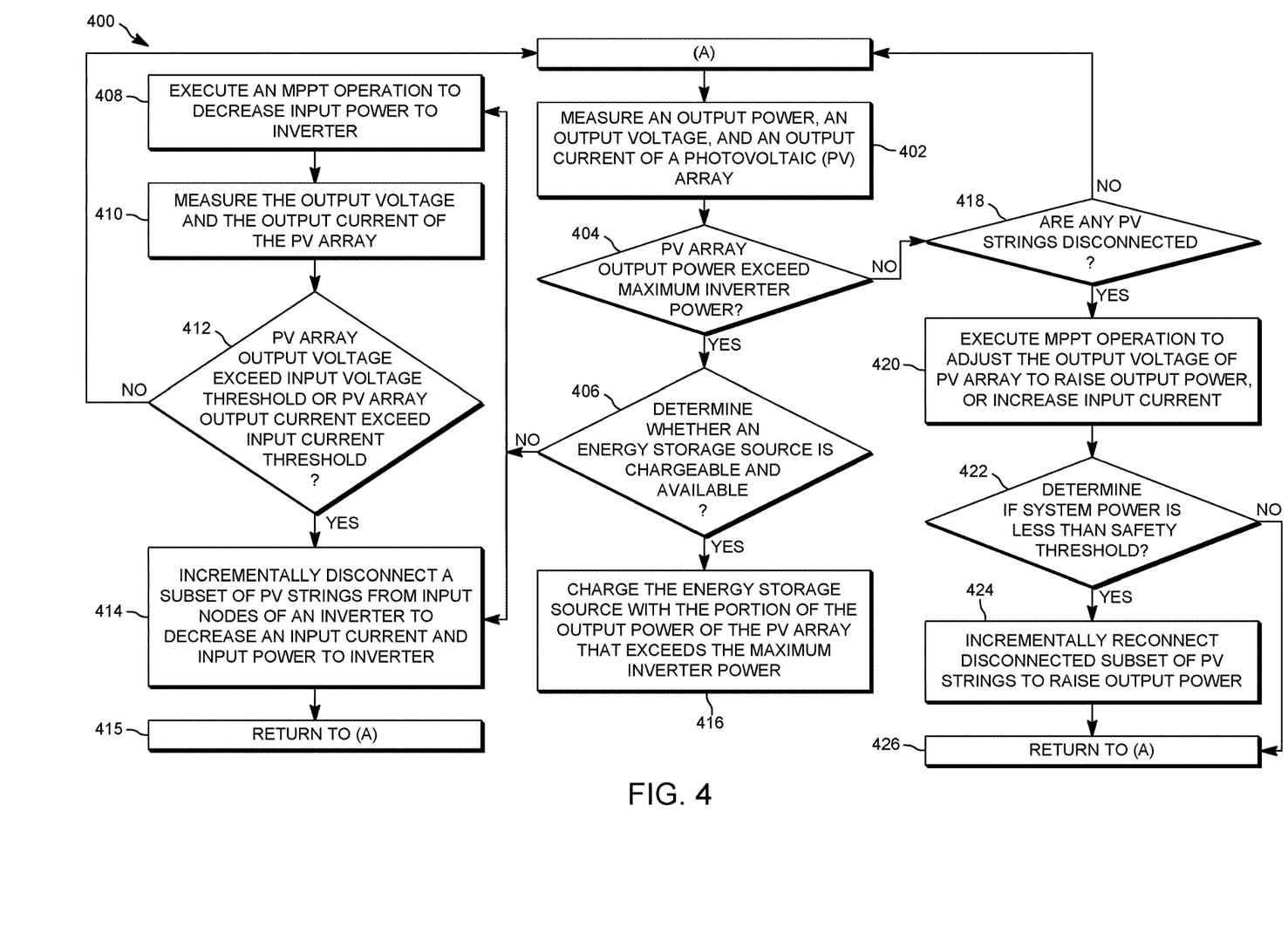
FIG. 4 is an example method of generating power in a photovoltaic power system.
Figure 5:
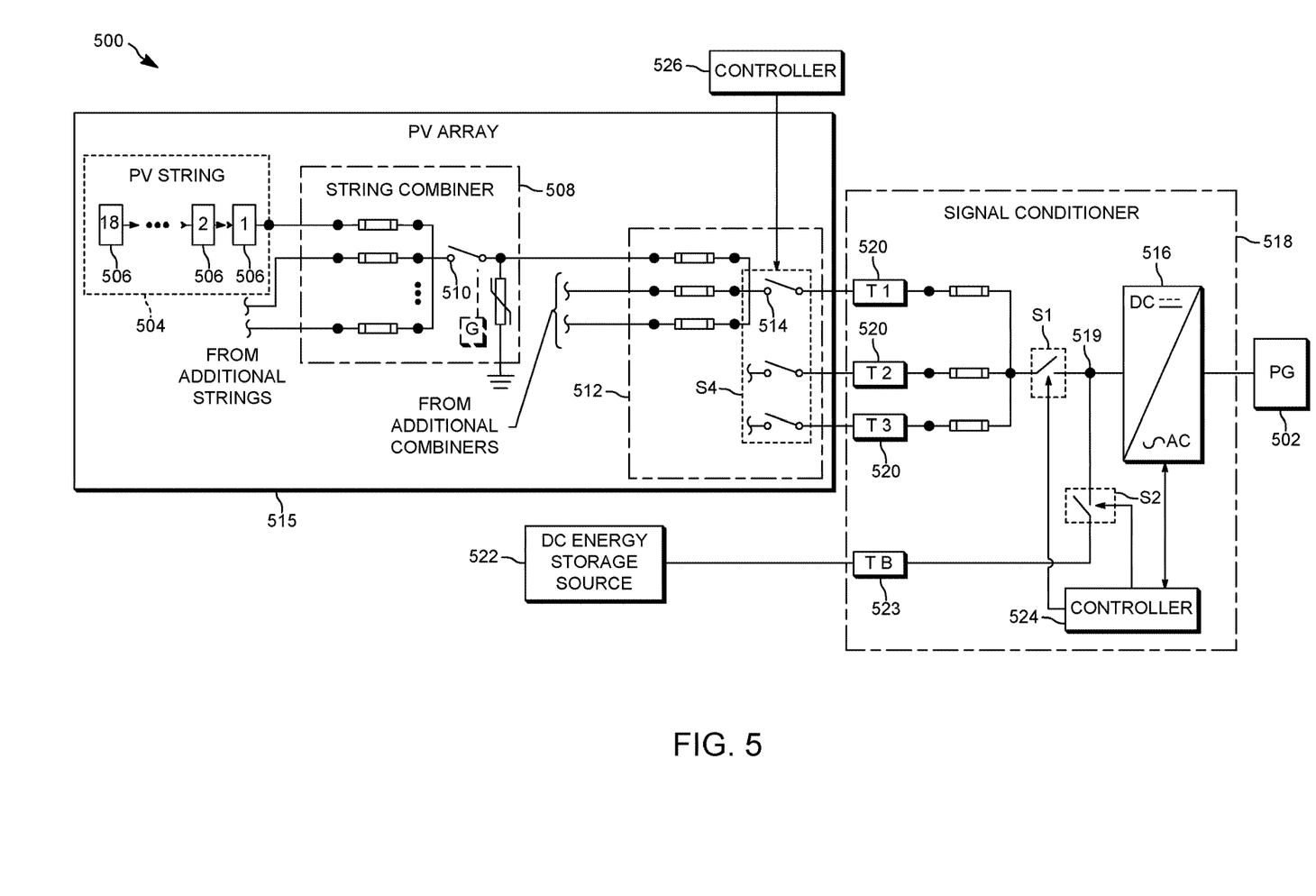
FIG. 5 illustrates another example of a power generation system.

FIG. 4 is an example method 400 of generating power in a photovoltaic power system, such as the photovoltaic power system 100 of FIG. 1, the photovoltaic power system 200 of FIG. 2, the photovoltaic power system 300 of FIG. 3, and/or the power generation system 500 of FIG. 5. In some examples, the method is implemented by a controller, such as the controller 110 of FIG. 1, the controller 210 of FIG. 2, the controller 310 of FIG. 3, and/or controller 526 or controller 524 of FIG. 5. At 402, the controller measures an output power, an output voltage, and an output current of a photovoltaic (PV) array. The measuring at 402 involves measuring the output power, the output voltage, and the output current of the PV array with respect to the PV strings and modules within the PV array. At 404, it is detected if the measured output power of the PV array exceeds a maximum inverter power. If the detection at 404 is negative (e.g., NO), the method 400 proceeds to 418. If the detection at 404 is positive (e.g., YES), the method 400 proceeds to 406. At 406, it is determined whether an energy storage source (such as a battery) is chargeable and available. For example, the energy storage source may be fully charged or off-line. If the determination at 406 is positive (e.g., YES), then the method 400 proceeds to 416. At 416, the energy storage source is charged with the portion of the output power of the PV array that exceeds the maximum inverter power.

However, if the determination at 406 is negative (e.g., NO), a maximum power point tracking (MPPT) operation is executed at 408 to decrease the output power of the PV array to decrease an input power provided to the inverter, as well as to adjust the input voltage and/or input current. The MPPT operation at 408 is executed by any of the modules of the system, such as the PV array, controller, or inverter. Additionally or alternatively, in some situations, the output voltage the PV array may continue to rise to a level exceeding a threshold, or the output current of the PV array may continue to rise to a level exceeding a threshold. That is, in some examples, the MPPT operation at 408 may not be sufficient to prevent the output voltage of the PV array from rising to the level that exceeds the input voltage threshold of the inverter, or to prevent the output current of the PV array from rising to a level that exceeds the input current threshold of the inverter. Thus, after executing the MPPT operation at 408, the method 400 proceeds to 410. At 410, the controller measures the output voltage and output current of the PV array, and then the method proceeds to 412. At 412, it is detected if the measured output voltage of the PV array exceeds an input voltage threshold of the inverter, or if the measured output current of the PV array exceeds an input current threshold of the inverter. If the detection at 412 is negative (e.g., NO), the method 400 proceeds back to the beginning of the method at 402 to repeat the process. If the detection at 412 is positive (e.g., YES), or if the MPPT operation at 408 has not been executed after a negative determination (e.g., NO) at 406, the method 400 proceeds to 414. At 414, to avoid damage to the inverter, a subset of PV strings of PV modules is incrementally disconnected from input nodes of the inverter (and in some examples, the DC-to-DC converter) to decrease the input current or input power to the inverter. The disconnections are incremental because the system will disconnect the strings one at a time, each time checking to see whether the output voltage of the PV array continues to exceed the input voltage threshold of the inverter, whether the output current of the PV array continues to exceed the input current threshold of the inverter, or whether the output power of the PV array continues to exceed an input power safety threshold. The disconnections are incremental also because, in some examples, the system will disconnect the strings one at a time, each time checking to see whether a specified DC-AC ratio is achieved (in addition to or as an alternative to checking whether the output voltage of the PV array continues to exceed the input voltage threshold of the inverter, whether the output current of the PV array continues to exceed the input current threshold of the inverter, or whether the output power of the PV array continues to exceed an input power safety threshold). The method 400 then repeats, by proceeding to 402 (see "return to (A)" at 415).

As noted, if detection at 404 is negative (e.g., NO at 404), then the method 400 proceeds to 418. At 418, it is determined if any PV strings have been disconnected. If the determination at 418 is positive (e.g., YES at 418), then at 420, the system (e.g., via a controller such as controller 110, controller 210, controller 310, controller 524 and/or 526) adjusts the output voltage of the PV array with an MPPT operation to raise the output power to meet a safety threshold (e.g., the maximum inverter power), or to increase the input current to the inverter. The method then proceeds to 422 to determine if the system power is still below the safety threshold. If the determination is negative (e.g., "NO") then the method proceeds to 426 to return to the beginning of the process at 402. If however the determination at 422 is positive (e.g., "YES"), then at 424, the disconnected subset of PV strings are incrementally reconnected to input nodes of the inverter (and in some examples, the DC-to-DC converter) to raise the output power of the photovoltaic system. The PV strings are incrementally reconnected until a desired array-to-inverter ratio is achieved. The reconnections are also incremental because in some examples, after each reconnection, it is checked whether the output voltage of the PV array is below the input voltage threshold of the inverter, whether the output current of the PV array is below the input current threshold of the inverter, or whether the output power of the PV array continues to below the input power safety threshold (e.g., the maximum inverter power). In some examples, the reconnections are incremental because after each reconnection, the system determines whether a predefined DC-AC ratio is achieved (in addition to or as an alternative to checking whether the output voltage of the PV array is below the input threshold voltage of the inverter, whether the output current of the PV array is below the input threshold current of the inverter, or whether the output power of the PV array is below the input power safety threshold). If the determination at 418 is negative (e.g., NO at 418), the method repeats, by proceeding to 402 (see "return to (A)" at 421). The power generation system continuously repeats method 400.

FIG. 5 illustrates an example of an arrangement for a power generation system 500 to provide AC power to a power grid 502. It is noted that the arrangement in FIG. 5 is only one example of a possible arrangement, many similar or different arrangements are possible, as is appreciated by one of ordinary skill in the art. The power generation system 500 has B number of PV strings 504 of PV modules 506 connected in series, where B is an integer greater than or equal to one. In some examples, each of the B number of PV strings 504 can have the same number of PV modules 506 connected in series (e.g., 18). In this situation, each PV string 504 is configured to provide a maximum output of about 8 amperes (A) of current. In other examples, the PV strings 504 can have different numbers of PV modules 506.

A set of PV strings 504 is coupled to an input of a string combiner 508. In some examples, three (3) PV strings 504 are coupled to a common output node 510 of the string combiner 508. In other examples, there are more or less PV strings 504 in the set of PV strings 504. Additionally, a set of string combiners 508 are coupled to an input of a combiner box 512. In some examples, three (3) string combiners 508 are coupled to a common output node 514 of the combiner box 512. In other examples, more or less string combiners 508 are in the set of string combiners 508. It is noted that the string combiners 508 and the combiner box 512 can collectively be referred to as a "combiner" in some examples. The PV strings 504, the string combiner 508 and the combiner box 512 (along with the constituent components) are collectively referred to as a PV array 515. The PV array 515 is employed as one example to implement the PV array 102 of FIG. 1, the PV array 202 of FIG. 2, and/or the PV array 302 of FIG. 3.

Each output of the combiner box 512 is coupled to an inverter 516 of a signal conditioner 518 at an input 519. In the present example, it is presumed that there are R number of outputs of the combiner box 512, where R is an integer greater than or equal to one. Additionally, R number of (current and voltage) transducers (T) 520 are coupled to the corresponding R number of outputs of the combiner box 512. Each transducer 520 can (passively) monitor a respective input signal provided to the inverter 516. Moreover, in some examples, each of the transducers 520 are integrated with the inverter 516. In some examples, the set of transducers 520 can collectively be employed to implement a PV array sensor. Thus, the transducers 520 provide substantially real time data characterizing the output of the PV array 515, which can collectively be referred to as PV data.

Additionally, the power generation system 500 includes a DC energy storage source 522. The DC energy storage source 522 is employed, for example to implement the energy storage source 108 of FIG. 1. The DC energy storage source 522 can represent a plurality of battery cells (or other DC source) coupled together to supply a voltage on the input 519 of the inverter 516. As one non-limiting example, the DC energy storage source 522 is formed of lithium ion battery cells. In other examples, the DC energy storage source 522 is formed of nickel metal hydride battery cells, nickel cadmium battery cells, lead-acid battery cells, fly wheels, flow batteries, etc. A (current and voltage) transducer 523 monitors an input signal provided at the input 519 of the inverter 516. The transducer 523 is employed to implement a DC energy storage sensor.

A first switch S1 is coupled between the input 519 and the output of the PV array 515. A second switch S2 is coupled between the DC energy storage source 522 and the input 519 of the inverter 516. A controller 524 of the signal conditioner 518 controls a state of the first switch, S1 and the second switch S2. In this manner, the PV array 515 and the DC energy storage source 522 are switchably connected to the input 519 of the inverter 516 and to each other. The controller 524 is implemented as a computing device (or multiple computing devices), such as a PLC or a microcontroller that executes machine-readable instructions. The controller 524 has a non-transitory machine-readable medium that stores the machine-readable instructions that (when executed) control operations of the power generation system 500.

The controller 524 receives signals from the current and voltage transducers 520 that (collectively) characterize PV data, which includes an output voltage and current of the PV array 515. Similarly, the controller 524 receives signals from the transducer 523 that characterizes DC energy storage data for the DC energy storage source 522. The DC energy storage data characterizes an output voltage, current and/or impedance of the DC energy storage source 522.

The power generation system 500 can operate in a first mode, wherein the first switch S1 is closed and the second switch S2 is opened. In the first mode, the controller 524 executes an MPPT (Maximum Power Point Tracking) procedure to identify and set the MPP of the PV array 515.

To execute the MPPT procedure, the controller 524 sets an effective output voltage of the PV array 515 at the inverter 516, or sets an effective output current of the PV array 515 at the inverter 516. In particular, to change the effective output voltage or the effective output current of the PV array 515, the controller 524 can change an input impedance of the inverter 516 at the input 519. The controller 524 receives a feedback signal from the inverter 516 characterizing the input voltage and input current to the input 519 and an output power of the inverter 516. It is understood that in other examples, more or less data may be provided in the feedback to the controller 524. The controller 524 adjusts (increases and decreases) the effective output voltage or the effective output current of the PV array 515 until the MPP (Maximum Power Point) is determined. Additionally, the MPP changes over time, and the MPPT procedure updates periodically (e.g., about every 10 minutes) and/or asynchronously (e.g., in response to a drop in output power) to determine an updated MPP.

The power generation system 500 charges the DC energy storage source 522 with a portion of an output power of the PV array 515 that exceeds a maximum power of the inverter 516. A controller 526 (in some examples, controller 526 and controller 524 are the same controller) is configured to incrementally disconnect subsets of the plurality of PV strings 504 of PV modules 506, via the collection of switches S4, from the signal conditioner 518 to decrease an input current and input power to the inverter 516 in response to an output voltage of the PV array 515 exceeding an input threshold voltage ($V_{TSH}$) of the inverter and the DC energy storage source 522 being un-chargeable or unavailable, or to decrease an input current and input power to the inverter 516 in response to an output current of the PV array 515 exceeding an input current threshold ($I_{TSH}$) and the DC energy storage source 522 being un-chargeable or unavailable. In some examples, the controller 526 decreases the output voltage of the PV array to increase the input current and input power to the inverter in response to at least one subset of the plurality of strings of PV modules being incrementally disconnected and the input power of the inverter being below an input power safety threshold $P_{TSH}$ of the inverter, the input power safety threshold $P_{TSH}$ of the inverter corresponding to a maximum inverter power.

The controller 526 is configured to incrementally reconnect the disconnected subsets of the plurality of PV strings 504 of PV modules 506 to the signal conditioner 518 to increase the input current and input power to the inverter 516 in response to a maximum output power of the PV array 504 falling below an input power safety threshold $P_{TSH}$ of the inverter 516. In response to the controller 526 incrementally reconnecting the disconnected subsets of the plurality of PV strings 504 of PV modules 506 to the signal conditioner 518, the DC energy storage source 522 is used to power the inverter 516, and maintain the maximum inverter power, as the power of the PV array 515 decreases below the maximum power of the inverter 516. In some examples, the inverter 516 includes a DC-to-DC converter that functions as a control system.

The power generation system 500 may also include a rotational PV connect/disconnect strategy. If the PV strings 504 are disconnected in a sequence (e.g., 1, 2, 3, 4), then an example reconnect strategy is sequenced the same way (e.g., 1, 2, 3, 4, rather than 4, 3, 2, 1), and the next disconnect is sequenced as 5, 6, 7 . . . (rather than 1, 2, 3 . . . again). An example connect/disconnect strategy of this type is an attempt to assure that strings are more equally disconnected which may extend the life of the power generation system 500. Another approach is to maintain a calculated record of curtailed power of each PV string 504 and disconnect and reconnect PV strings 504 to substantially maintain all PV strings 504 at an equivalent total amount of curtailment, e.g. the PV string 504 with the lowest total curtailed power is disconnected first (thereby increasing it curtailed power) and reconnected last.

Figure 6:
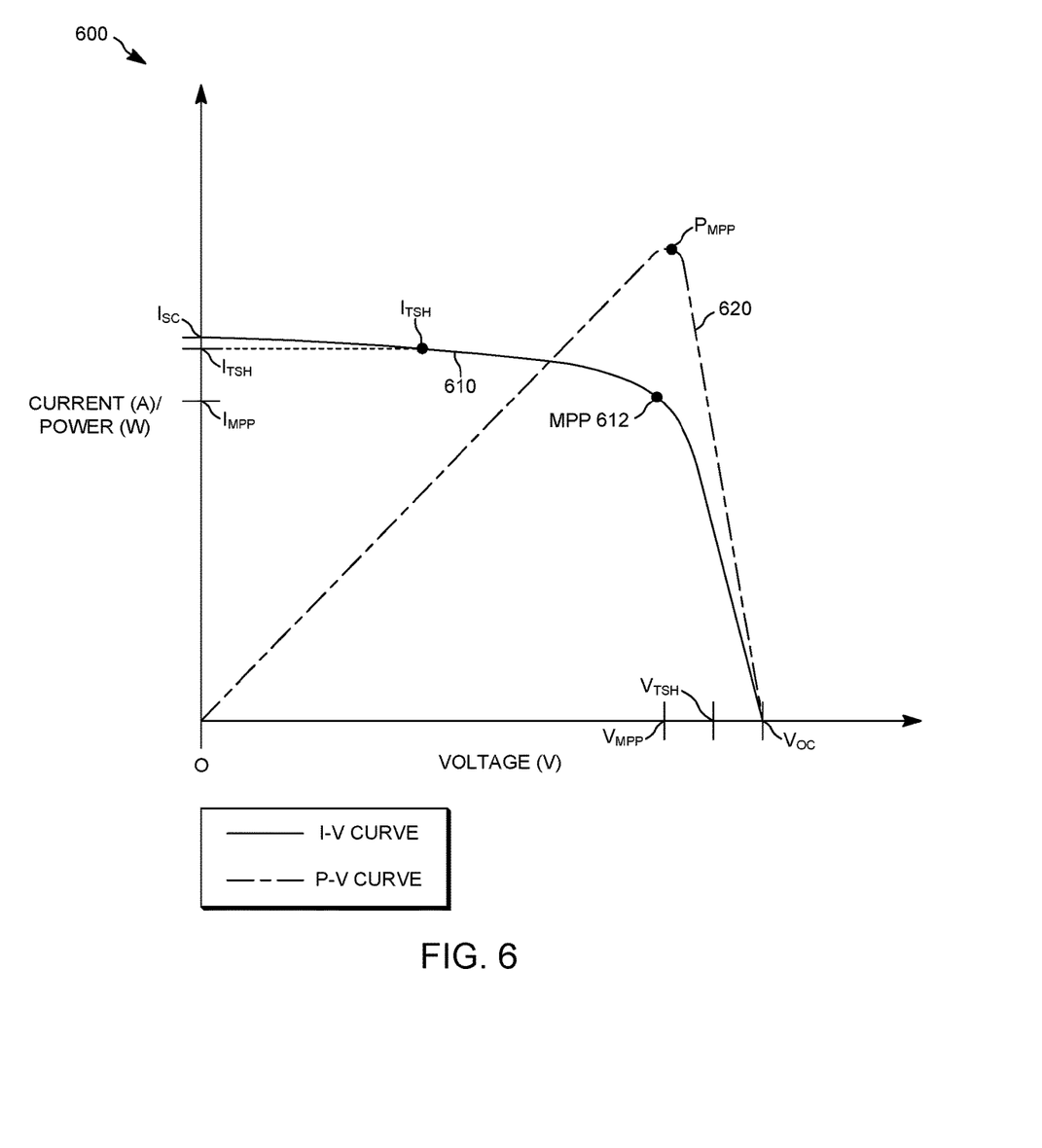
FIG. 6 illustrates a diagram for determining a maximum power point of a photovoltaic array.

FIG. 6 illustrates a chart 600 that demonstrates the MPPT procedure. The following discussion discusses the MPPT procedure relative to the photovoltaic power system of FIG. 5, but also applies to the photovoltaic power systems depicted in FIG. 1, FIG. 2, and FIG. 3. The chart 600 includes a current-voltage (I-V) plot 610 that plots input current as a function effective output voltage. The plot 610 represents an example of an output current, in amperes (A) provided to the inverter 516 at the input 519 as a function of the effective output voltage, in volts (V) of the PV array 515 of FIG. 5. Additionally, the chart 600 includes a power-voltage (P-V) plot 620 that represents an example of an output power, in Watts (W) plotted as a function of the effective output voltage (in V) (and by extension/inference as a function of the effective output current (in W)). Thus, the plot 620 represents an example of an output power by the inverter 516 as a function of the effective output voltage applied by the PV array 515 at the input 519 of the inverter 516 or the effective output current applied by the PV array 515 at the input 519 of the inverter 516.

As illustrated by the plot 610, the current decreases from a short circuit current, $I_{SC}$ to about 0 A as the effective output voltage of the PV array 515 increases from about 0 V (a short circuit) to an open circuit voltage, $V_{OC}$. Moreover, as illustrated by the plot 620, the output power increases from about 0 W to a Power maximum power point ($P_{MPP}$) as the effective output voltage increases from about 0 to a voltage maximum power point ($V_{MPP}$). Additionally, the output power decreases from the $P_{MPP}$ to about 0 W as the voltage increases from the $V_{MPP}$ to $V_{OC}$.

During the MPPT procedure, the effective output voltage of the PV array 515 or the effective output current of the PV array 515 is increased or decreased to determine an effect on the output power. In particular, the effective output voltage (e.g., the effective output voltage of the PV array 515) or the effective output current (e.g., the effective output current of the PV array 515) is increased or decreased until the $P_{MPP}$ and the $V_{MPP}$ are identified. Upon identification of the $V_{MPP}$, a current maximum power point, $I_{MPP}$ is also determined/identified (or vice versa), as indicated by the plot 610. A controller (e.g., the controller 524) sets the effective output voltage of the $V_{MPP}$, which induces a current at the $I_{MPP}$ (or vice versa) and results in the MPP 612 on the I-V plot 610. As illustrated by the chart 600, the $P_{MPP}$ and the MPP are positioned on the same point of the voltage axis. Thus, setting the effective output voltage to the $V_{MPP}$, induces the $I_{MPP}$, which results in MPP and $P_{MPP}$. Conversely, setting the effective output current to the $I_{MPP}$, induces the $V_{MPP}$, which results in MPP and $P_{MPP}$. The voltage increases (and the current changes) as the DC energy storage source 522 (e.g., a battery) is fully charged and the P-V power exceeds the maximum inverter power. The voltage level $V_{TSH}$ represents the voltage level (e.g., an input voltage threshold) at which point damage is caused to the inverter (e.g., inverter 516), such that $V_{MPP} < V_{TSH} < V_{OC}$. $I_{TSH}$ represents the current level (e.g., an input current threshold) at which point damage is caused to the inverter (e.g., inverter 516). The battery charging begins when the P-V power (at $V_{MPP}$ and $I_{MPP}$) exceeds the inverter maximum power. To the extent that there is excess P-V power, the system (e.g., power generation system 500) draws P-V power to charge the DC energy storage source 522 (e.g. a battery) to maintain $V_{MPP}$ and $I_{MPP}$ on the PV array 515. Then, after the energy storage source 522 is fully charged, the voltage is allowed to rise until (if and when) the threshold $V_{TSH}$ or $I_{TSH}$ is reached and the PV array 515 is incrementally disconnected.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A power generation system, comprising:
   a photovoltaic (PV) array comprising a plurality of strings of PV modules, wherein each string is switchably connected to a respective input node;
   an inverter comprising a plurality of inputs, wherein each input of the inverter is coupled to each respective input node, and wherein each respective input node is coupled to a respective input of a DC-to-DC converter;
   an output of the DC-to-DC converter switchably connected to the energy storage source via an energy storage source switch, wherein the DC-to-DC converter charges the energy storage source with a portion of an output power of the PV array that exceeds a maximum inverter power when the energy storage source switch is closed;

a controller that incrementally disconnects subsets of the plurality of strings of PV modules from the respective input nodes to decrease an input current and input power to the inverter in response to an output voltage of the PV array meeting or exceeding an input voltage threshold $V_{TSH}$ of the inverter and the energy storage source being un-chargeable or unavailable, or to decrease an input current and input power to the inverter in response to an output current of the PV array meeting or exceeding an input current threshold $I_{TSH}$ of the inverter and the energy storage source being un-chargeable or unavailable; and wherein the controller decreases the output voltage of the PV array to increase the input current and input power to the inverter in response to at least one subset of the plurality of strings of PV modules being incrementally disconnected and the input power of the inverter being below an input power safety threshold $P_{TSH}$ of the inverter, the input power safety threshold $P_{TSH}$ of the inverter corresponding to a maximum inverter power.

2. The power generation system of claim 1, wherein the controller incrementally reconnects the disconnected subsets of the plurality of strings of PV modules to the input nodes coupled to the inputs of the DC-to-DC converter and the inverter to increase the input current and input power to the inverter in response to a maximum output power of the PV array falling below the input power safety threshold $P_{TSH}$ of the inverter.

3. The power generation system of claim 2, wherein in response to the controller incrementally reconnecting the disconnected subsets of the plurality of strings of PV modules to the input nodes coupled to the inputs of the DC-to-DC converter and the inverter, the energy storage source is used to power the inverter, and maintain a maximum power point voltage ($V_{MPP}$) and the maximum inverter power, as the power of the PV array decreases below the maximum inverter power.

4. The power generation system of claim 1, wherein the plurality of strings of PV modules are switchably connected to the respective input nodes via a collection of input node switches controlled by the controller, and wherein the collection of input node switches either is implemented as an array of relays external to the DC-to-DC converter, or is integrated within the DC-to-DC converter.

5. The power generation system of claim 1, further comprising one or more string combiners that aggregate respective output voltage signals of the plurality of strings of PV modules, wherein the output voltage signals are aggregated by the one or more string combiners with a string combiner switch controlled by the controller.

6. The power generation system of claim 1, wherein the controller incrementally disconnects subsets of the plurality of strings of PV modules from the respective input nodes to decrease an input current and input power to the inverter in response to an output power of the PV array meeting or exceeding the input power safety threshold $P_{TSH}$ of the inverter, and the energy storage source being un-chargeable or unavailable.

7. The power generation system of claim 1, wherein a voltage corresponding to a maximum power point of the PV array ($V_{MPP}$) is less than the input voltage threshold $V_{TSH}$ of the inverter and the input voltage threshold $V_{TSH}$ of the inverter is a safety voltage based upon protection of the inverter.

8. The power generation system of claim 1, wherein the inverter converts direct current (DC) to alternating current (AC) that is provided to an AC power load, and the energy storage source is a battery.

9. A method of generating power, comprising:

measuring an output power, an output voltage, and an output current of a photovoltaic (PV) array;

detecting whether the measured output power of the PV array exceeds a maximum inverter power;

detecting whether the output voltage of the PV array exceeds an input voltage threshold $V_{TSH}$ of the inverter;

detecting whether the output current of the PV array exceeds in input current threshold $I_{TSH}$ of the inverter;

determining whether an energy storage source is chargeable and available;

charging the energy storage source with a portion of the output power of the PV array that exceeds the maximum inverter power in response to detecting that the measured output power of the PV array exceeds the maximum inverter power and determining that the energy storage source is chargeable and available;

incrementally disconnecting subsets of a plurality of strings of PV modules of the PV array from the respective input nodes of a DC-to-DC converter and the inverter to decrease an input current and input power to the inverter in response to detecting that the output voltage of the PV array meets or exceeds the input voltage threshold $V_{TSH}$ of the inverter and determining that the energy storage source is un-chargeable or unavailable, or to decrease an input current and an input power to the inverter in response to detecting that the output current of the PV array meets or exceeds the input current threshold $I_{TSH}$ of the inverter and determining that the energy storage source is un-chargeable or unavailable; and decreasing the output voltage of the PV array to increase the input current and input power to the inverter in response to at least one subset of the plurality of strings of PV modules being incrementally disconnected and the input power of the inverter being below an input power safety threshold $P_{TSH}$ of the inverter, the input power safety threshold $P_{TSH}$ of the inverter corresponding to the maximum inverter power.

10. The method of claim 9, further comprising:

determining whether the output voltage of the PV array meets or exceeds the input voltage threshold $V_{TSH}$ of the inverter after each incremental disconnection of one of the subsets of the plurality of strings of PV modules of the PV array;

incrementally reconnecting one of the subsets of the plurality of strings of PV modules of the PV array to increase the input power to the inverter; and determining whether the input power of the inverter remains below the input power safety threshold $P_{TSH}$ of the inverter after each incremental reconnection of one of the subsets of the plurality of strings of PV modules of the PV array.

11. The method of claim 9, further comprising:

determining whether the output current of the PV array meets or exceeds the input current threshold $I_{TSH}$ of the inverter after each incremental disconnection of one of the subsets of the plurality of strings of PV modules of the PV array;

incrementally reconnecting one of the subsets of the plurality of strings of PV modules of the PV array to increase the input power to the inverter; and determining whether the input power of the inverter remains below the input power safety threshold $P_{TSH}$ of the inverter after each incremental reconnection of one of the subsets of the plurality of strings of PV modules of the PV array.

12. The method of claim 9, further comprising:
incrementally reconnecting one of the disconnected subsets of the plurality of strings of PV modules of the PV array to the input nodes coupled to the inputs of the DC-to-DC converter and the inverter to increase the input power to the inverter and/or to increase the input current to the inverter; and
determining whether a predefined DC-AC ratio is achieved after each incremental reconnection.

13. The method of claim 9, further comprising executing a maximum power point tracking (MPPT) operation to decrease the output power of the PV array to decrease an input power provided to the inverter in response to detecting that the output power of the PV array exceeds the maximum inverter power, after determining that the energy storage source is either un-chargeable or unavailable, and prior to incrementally disconnecting subsets of the plurality of strings of PV modules of the PV array from respective input nodes of the DC-to-DC converter and the inverter to decrease the input power to the inverter or to decrease the input current to the inverter.

14. The method of claim 9, further comprising:
incrementally reconnecting the disconnected subsets of the plurality of strings of PV modules to the input nodes coupled to the inputs of the DC-to-DC converter and the inverter;
powering the inverter by the energy storage source; and
maintaining a maximum power point voltage ($V_{MPP}$) and the maximum inverter power, as the output power of the PV array decreases below the maximum inverter power.

15. The method of claim 9, wherein a voltage corresponding to a maximum power point of the PV array ($V_{MPP}$) is less than the input voltage threshold $V_{TSH}$ of the inverter, and the input voltage threshold $V_{TSH}$ of the inverter is a safety voltage based upon protection of the inverter.

16. The method of claim 9, wherein:
the controller adjusts the output voltage of the PV array with an MPPT operation to raise the output power of a photovoltaic system to meet a safety threshold in response to disconnecting a subset of the strings of the PV array; and
the controller incrementally reconnects subset of the PV strings of PV modules to the inverter to raise the output power of the photovoltaic system in response to the maximum power of the PV array being below the safety threshold of the inverter after the MPPT operation.

17. A power generation system comprising:
an inverter coupled to a power grid;
a photovoltaic (PV) array switchably connected to the inverter, the PV array comprising a plurality of strings of PV modules;
a DC energy storage source switchably connected to the inverter and the PV array, wherein the PV array charges the DC energy storage source with a portion of an output power of the PV array that exceeds a maximum inverter power; and
a controller that incrementally disconnects subsets of the plurality of strings of PV modules from a signal conditioner to decrease an input current and input power to the inverter in response to an output voltage of the PV array meeting or exceeding an input voltage threshold $V_{TSH}$ of the inverter and the DC energy storage source being un-chargeable or unavailable, or to decrease an input current and input power to the inverter in response to an output current of the PV array meeting or exceeding an input current threshold $I_{TSH}$ of the inverter and the energy storage source being un-chargeable or unavailable;
wherein the controller decreases the output voltage of the PV array to increase the input current and input power to the inverter in response to at least one subset of the plurality of strings of PV modules being incrementally disconnected and the input power of the inverter being below an input power safety threshold $P_{TSH}$ of the inverter, the input power safety threshold $P_{TSH}$ of the inverter corresponding to a maximum inverter power.

18. The power generation system of claim 17, wherein the controller incrementally reconnects the disconnected subsets of the plurality of strings of PV modules to the signal conditioner to increase the input current and input power to the inverter in response to a maximum output power of the PV array falling below the input power safety threshold $P_{TSH}$ of the inverter.

19. The power generation system of claim 17, wherein in response to the controller incrementally reconnecting the disconnected subsets of the plurality of strings of PV modules to the signal conditioner, the DC energy storage source is used to power the inverter, and maintain the maximum inverter power, as the power of the PV array decreases below the maximum inverter power.

20. The power generation system of claim 17, wherein the inverter comprises a DC-to-DC converter that functions as a control system.

* * * * *